United States Patent
Brown

(10) Patent No.: US 9,758,240 B2
(45) Date of Patent: Sep. 12, 2017

(54) MODULAR PLENUM AND DUCT SYSTEM FOR CONTROLLING BOUNDARY LAYER AIRFLOW

(71) Applicant: ROHR, INC., Chula Vista, CA (US)

(72) Inventor: Keith T. Brown, Bonita, CA (US)

(73) Assignee: Rohr, Inc., Chula Vista, CA (US)

(*) Notice: Subject to any disclaimer, the term of this patent is extended or adjusted under 35 U.S.C. 154(b) by 790 days.

(21) Appl. No.: 14/262,494

(22) Filed: Apr. 25, 2014

(65) Prior Publication Data

US 2016/0137291 A1   May 19, 2016

(51) Int. Cl.
  *F04D 31/00*   (2006.01)
  *B64C 21/06*   (2006.01)
  *B64D 33/02*   (2006.01)

(52) U.S. Cl.
  CPC .............. *B64C 21/06* (2013.01); *B64D 33/02* (2013.01); *B64D 2033/0226* (2013.01); *Y02T 50/166* (2013.01)

(58) Field of Classification Search
  CPC ... B64C 21/025; B64C 21/08; B64C 2230/04; B64C 2230/06; B64D 2033/0226; Y02T 50/166; F15D 1/12
  See application file for complete search history.

(56) References Cited

U.S. PATENT DOCUMENTS

| | | | | |
|---|---|---|---|---|
| 2,742,247 A * | 4/1956 | Lachmann | ............... | B64C 21/06 114/20.1 |
| 3,261,576 A * | 7/1966 | Valyi | ....................... | B64C 23/00 244/130 |
| 4,749,150 A * | 6/1988 | Rose | ....................... | B64C 21/06 181/214 |
| 5,263,667 A * | 11/1993 | Horstman | ............... | B64C 21/06 244/130 |
| 5,297,765 A * | 3/1994 | Hughes | .................... | B64C 21/06 244/130 |
| 5,357,742 A * | 10/1994 | Miller | .................... | B64D 33/08 244/53 B |
| 5,618,363 A * | 4/1997 | Mullender | ............. | B29C 33/52 156/155 |
| 5,743,493 A * | 4/1998 | McCaughan | ......... | B64C 21/025 244/130 |
| 5,934,611 A * | 8/1999 | Tindell | .................. | B64C 21/025 181/214 |
| 6,622,973 B2 * | 9/2003 | Al-Garni | ............... | B63H 25/40 244/206 |
| 6,752,358 B1 * | 6/2004 | Williams | .................. | B64C 1/12 244/208 |

(Continued)

*Primary Examiner* — Jesse Bogue
(74) *Attorney, Agent, or Firm* — Snell & Wilmer L.L.P.

(57) ABSTRACT

A system for controlling aircraft boundary layer airflow comprising a frame structure configured to be coupled or integral to an inner surface of an aircraft nacelle, the frame configured to support to the nacelle, and/or a modular plenum configured to be received by the frame structure, the modular plenum comprising a truncated tetrahedron intersected at its apex by a duct. The frame may comprise a plurality of sub-frames. The system may further comprise a plurality of modular plenums, each configured to fit within a sub-frame. The system may further comprise a flexible material configured to couple a first duct to a second duct. The system may further comprise a nacelle configured to receive the system.

13 Claims, 9 Drawing Sheets

(56) References Cited

U.S. PATENT DOCUMENTS

| | | | | |
|---|---|---|---|---|
| 7,048,230 B2* | 5/2006 | Meyer | ................... | B64D 33/02 |
| | | | | 244/130 |
| 7,766,280 B2* | 8/2010 | Cloft | ..................... | B64D 33/02 |
| | | | | 244/208 |
| 8,192,147 B2* | 6/2012 | Haas | ..................... | B64D 33/02 |
| | | | | 415/144 |
| 8,757,319 B2* | 6/2014 | Bouteiller | .............. | B64D 33/02 |
| | | | | 181/213 |
| 8,931,252 B2* | 1/2015 | Richardson | ............... | F02C 7/04 |
| | | | | 137/15.2 |
| 2005/0045774 A1* | 3/2005 | Hocking | ................. | B64C 21/06 |
| | | | | 244/209 |
| 2005/0081530 A1* | 4/2005 | Bagnall | ................... | B64C 21/06 |
| | | | | 60/785 |
| 2009/0212165 A1* | 8/2009 | Parikh | ..................... | B64C 21/06 |
| | | | | 244/209 |
| 2009/0266937 A1* | 10/2009 | Frankenberger | ........ | B64C 21/06 |
| | | | | 244/209 |
| 2010/0294892 A1* | 11/2010 | Syassen | ................. | B64C 21/06 |
| | | | | 244/209 |
| 2015/0083258 A1* | 3/2015 | Rupp | ..................... | F15D 1/008 |
| | | | | 137/803 |

* cited by examiner

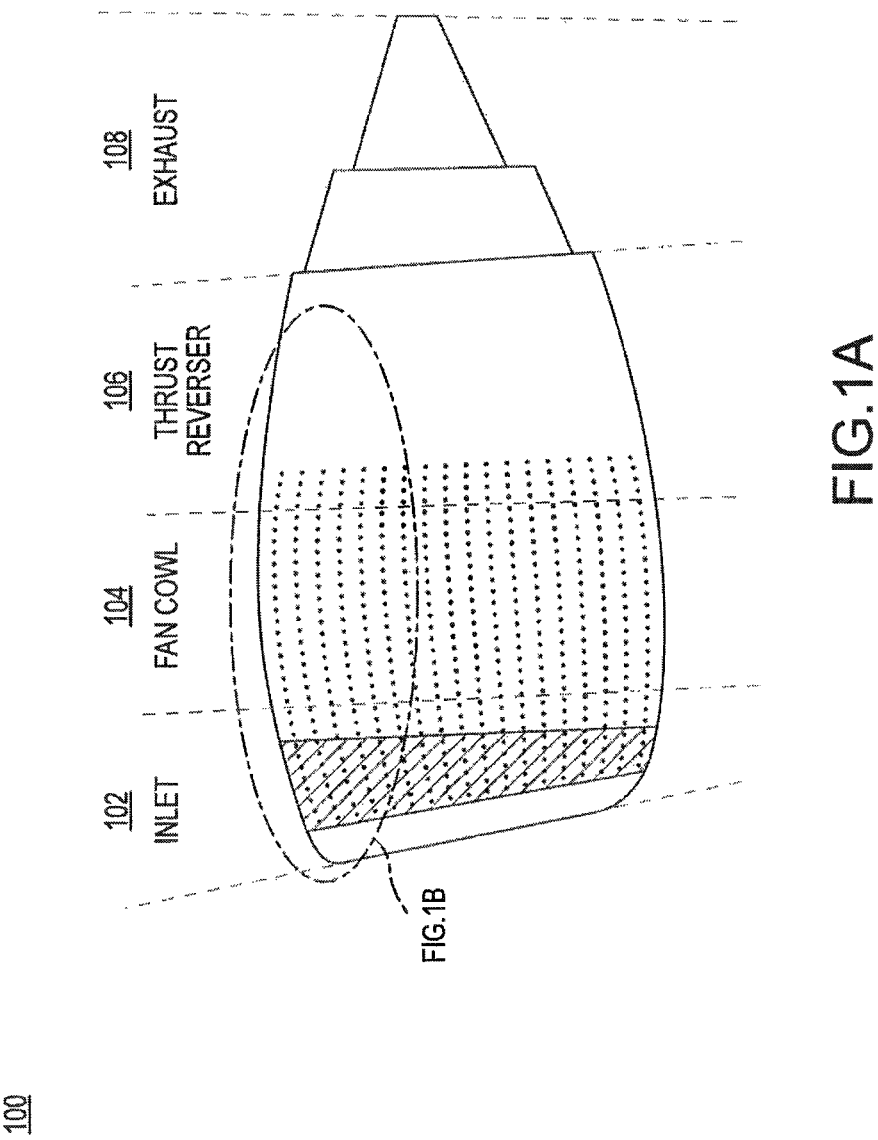

SECTION X-X

MODULAR PLENUM AND DUCT SYSTEM FOR CONTROLLING BOUNDARY LAYER AIRFLOW

FIELD

The present disclosure relates to the control of laminar flow over an aircraft nacelle, and more particularly to the control of laminar flow using a plurality of modular plenums.

BACKGROUND

The flow of air immediately adjacent the surface of an aircraft nacelle may be referred to as boundary layer airflow. The manner in which boundary layer air flows over the surface of an aircraft nacelle may impact the operational efficiency of the aircraft. For example, if boundary layer airflow is not laminar, but turbulent (eddying about within the boundary layer), the operational efficiency of the aircraft may decrease in response to the drag produced by the turbulent flow. In contrast, if the flow over the nacelle is laminar, the operational efficiency of the aircraft may be expected to increase, because air in the boundary layer flows smoothly over the nacelle, reducing drag.

SUMMARY

A system for controlling aircraft boundary layer airflow comprising a frame structure configured to be coupled or integral to an inner surface of an aircraft nacelle, the frame configured to support to the nacelle, and/or a modular plenum configured to be received by the frame structure, the modular plenum comprising a truncated tetrahedron intersected at its apex by a duct. The frame may comprise a plurality of sub-frames. The system may further comprise a plurality of modular plenums, each configured to fit within a sub-frame. The system may further comprise a flexible material configured to couple a first duct to a second duct. The system may further comprise a nacelle configured to receive the system. The system may further comprise a perforated outer surface, wherein air enters the modular plenum through the perforated outer surface. The system may further comprise a pump (or pumps) that draw air into the modular plenum.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1A illustrates, in accordance with various embodiments, a perspective view of an aircraft nacelle having a plurality of micro-perforations distributed about the surface of a portion of the nacelle;

DETAILED DESCRIPTION

Figure 1B:
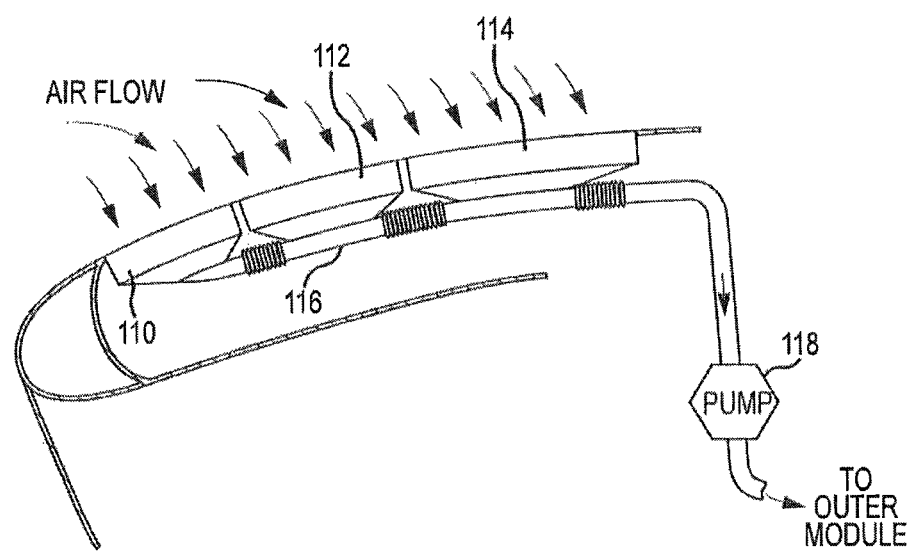
FIG. 1B illustrates, in accordance with various embodiments, a cross-sectional view of a portion of the nacelle having a plurality of modular plenums.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A nacelle 100 is shown in FIG. 1A. As an example, a nacelle 100 typically encloses an engine and is positioned externally of the engine that powers the aircraft to which it is coupled. The nacelle 100, as shown, may be generally divided into four sections. These are the inlet 102, the fan cowl 104, the thrust reverser 106, and the exhaust 108 (which may comprise a nozzle structure).

As air flows in the boundary layer over the nacelle 100, it may eddy and swirl to generate turbulence. As described above, this turbulence may increase drag, which may, in turn, reduce efficiency.

To compensate for this effect, conventional systems have incorporated perforations. Air may pass into these perforations, with or without a separate motive device such as a pump situated within the nacelle. After passing through the perforations, air may be deposited within a cavity or plenum. The weight of conventional systems may, however, cause the outer surface of the nacelle (e.g., the "skin") to sag or distort. This typically requires additional structure to be added to compensate for this shortfall. Moreover, conventional plenums do not support the nacelle outer surface. Rather, as described above, they tend to weaken and distort the nacelle outer surface. Additionally, conventional systems require independent ducting plus their support structure (0, clamps, hardware, and the like) must be included as well.

With reference to FIGS. 1A and 1B, a nacelle 100 having a perforated outer surface coupled to a plurality of modular plenums is shown.

In various embodiments, a plenum may be manufactured by way of a variety of manufacturing techniques, such as injection molding, thermoplastic molding, and the like. In addition, each plenum may or may not bear the weight of the nacelle (or bear little weight of the nacelle). Injection molding may further reduce the cost of the system. The plenums may comprise, as described herein, a repeated design, many identical to others, thereby reducing the need for plenum customization. In addition, with particular reference to FIG. 1B, the deficiencies associated with conventional turbulence calming systems may be overcome by the placement of a plurality of modular plenums, such as plenums 110, 112, and 114 disposed within the nacelle 100 (as described herein). Modular plenums may, as described below, and in various embodiments, add strength and stability lacking, for example, in modern conventional systems. Moreover, modular plenums may reduce the cost associated with the manufacture and installation of a plenum structure, because a plurality of modular plenums may be constructed to a single specification. Additionally by incorporating a duct into the plenum structure fewer parts (e.g., conventional ducting systems) may be required to assemble a system providing for a lighter installation.

In various embodiments, modular plenums may be constructed to a particular size or specification to fit a particular area of the nacelle 100, while a different size may be better suited to a different area of the nacelle. Thus, modular plenums of varying sizes/footprints may be constructed and incorporated.

As shown with respect to FIG. 1B, as described below, a plurality of modular plenums may be coupled, one to the next adjacent modular plenum, to create a larger modular part (see, also FIG. 3). The plenums 110,112 and 114 may be connected together by an integral duct 116. This duct 116 may be coupled to a pump 118 (or pumps) situated within or without the nacelle 100, so that air may be taken in by the pump 118 through the plurality of perforations in the outer surface of the nacelle 100, into each modular plenum 110,112, and 114, into the duct 116, and through the pump 118. In various embodiments, air drawn through the pump 118 may be deposited outside of the nacelle 100.

Figure 2:
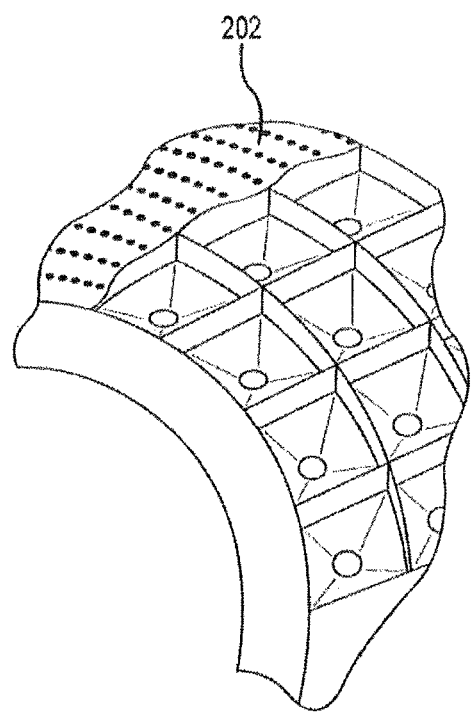
FIG. 2 illustrates, in accordance with various embodiments, a perspective view of a portion of a nacelle with the outer perforated outer surface removed for clarity as to the underlying modular plenums.

FIG. 2 shows how a plurality of modular plenums might be situated beneath the perforated outer surface 202 of the nacelle 100. As shown, modular plenums may be arranged around the circumference of the nacelle 100 in annular columns, where each modular plenum in the annular column may be coupled to pump 118 by a duct 116. The plurality of modular plenums may also be arranged axially, along a length of the nacelle, and coupled by a duct 116 to the pump 118. Further still, in various embodiments, any arrangement of modular plenums may be coupled to one another by a simple flexible duct 606 (see, e.g., FIG. 6) and then coupled as a group to the pump 118. In addition, each modular plenum may, on its own, be coupled to the pump 118.

In various embodiments, the use of a plurality of modular plenums supported by a frame and/or a plurality of sub-frames (as described below) may enhance support per unit area of the nacelle, yet maintain fluid communication between the pump and one or more plenums. This support structure may be lightweight or ultra-lightweight, thereby reducing weight (and increasing efficiency).

Figure 3:
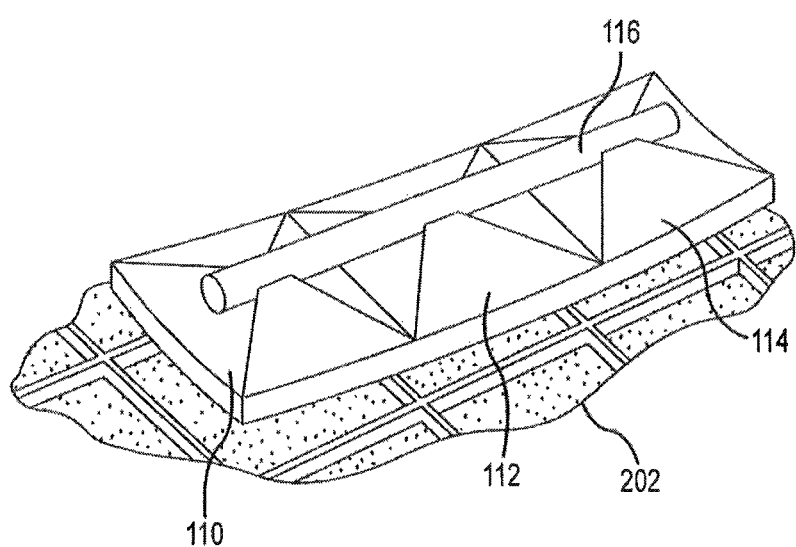
FIG. 3 illustrates, in accordance with various embodiments, an exploded view of a plurality of modular plenums.

FIG. 3 shows an exploded view of a plurality of modular plenums 110, 112, and 114. These modular plenums may be combined to create a larger modular part and may, as shown, fit over a perforated outer surface 202. Further, as shown, each modular plenum may comprise a tetrahedron truncated or intersected at its apex by the duct 116. However, any shape of modular plenum is contemplated by this disclosure (e.g., triangular or hexagonal plenums may more suitable for a variety of integration and/or performance conditions). Where a modular plenum is intersected at its apex by the duct 116, (as best shown with reference to FIG. 4C), an opening in the apex of the modular plenum and duct 116 may permit air to flow into the duct 116.

Figure 4C:
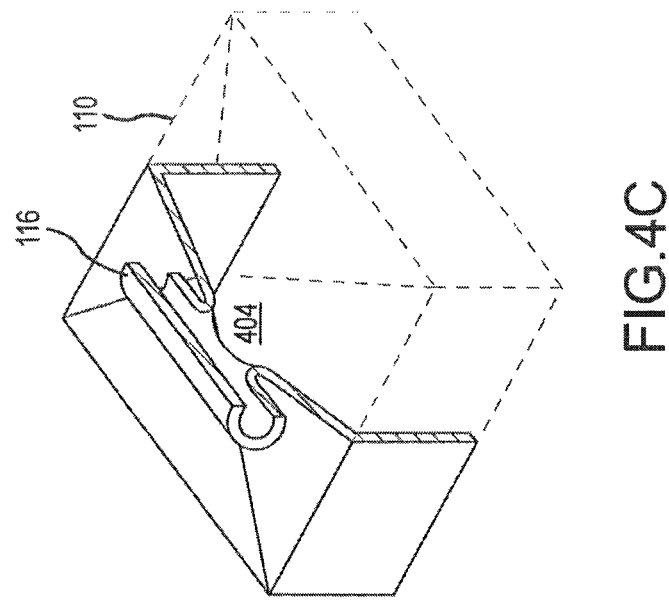
FIG. 4C illustrates, in accordance with various embodiments, a perspective cross-sectional view of a modular plenum.
Figure 4A:
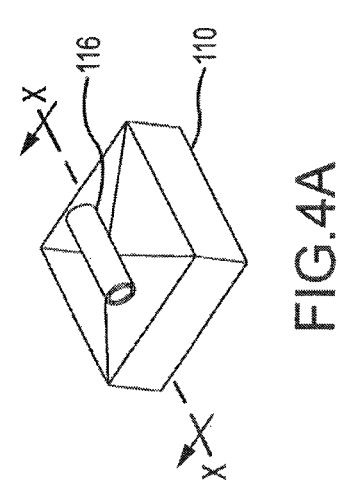
FIG. 4A illustrates, in accordance with various embodiments, a perspective view of a single modular plenum.
Figure 4B:
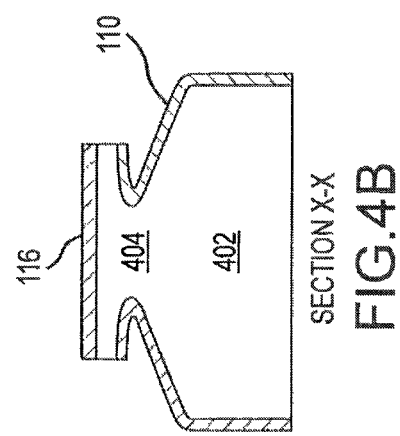
FIG. 4B illustrates, in accordance with various embodiments, a side cross-sectional view of a modular plenum.

FIGS. 4A-4C illustrate, from a variety of perspectives, the construction of a modular plenum 110. FIG. 4A shows a single modular plenum 110. If a cross-section of the modular plenum 110 is taken along the axis marked X-X', as shown at FIG. 4B, the modular plenum 110 comprises a chamber 402 coupled to the duct 116. Thus, the duct 116 intersects or truncates the apex of the tetrahedral modular plenum 110, introducing an aperture or opening 404 between the chamber 402 and the duct 116. FIG. 4C shows a perspective cross-sectional view of a single modular plenum 110. As shown, the duct 116 intersects the apex of the modular plenum 110 to form the opening 404.

Figure 4D:
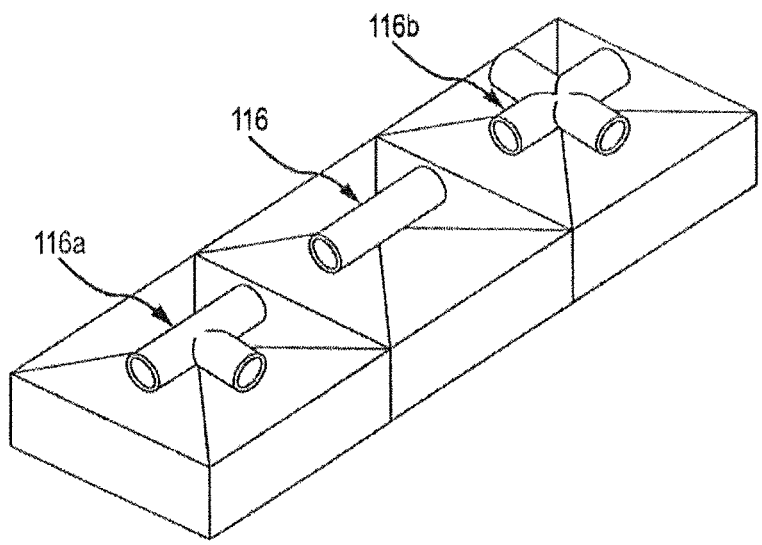
FIG. 4D illustrates, in accordance with various embodiments, a perspective view of a plurality of modular plenums.
Figure 4E:
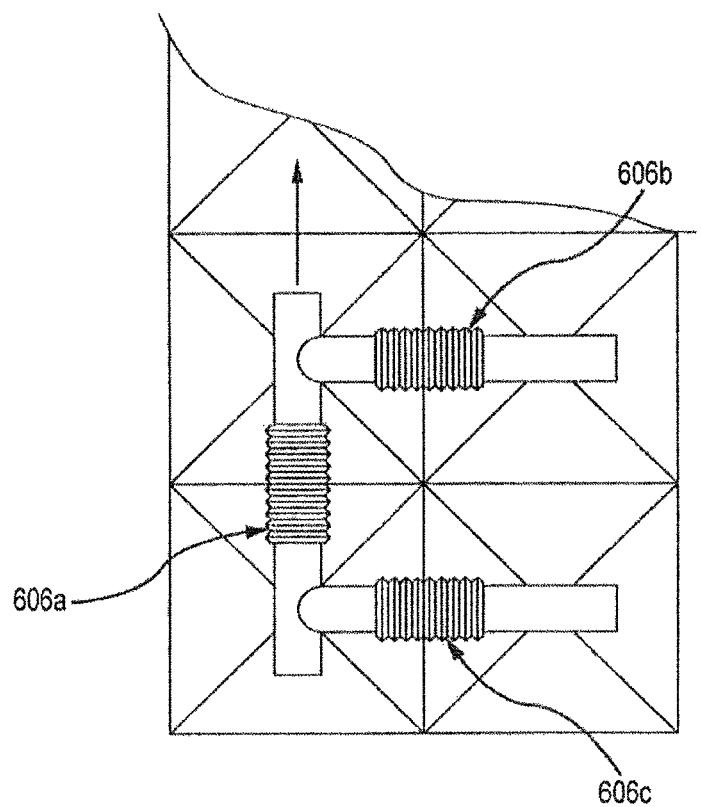
FIG. 4E illustrates, in accordance with various embodiments, a top perspective view of a plurality of modular plenums.

In various embodiments, and as shown with respect to FIGS. 4D and 4C, a duct may be variously configured. For instance, as shown, a duct 116a and/or 116b may comprise a branched or bifurcated architecture (e.g., a "t-shape," a "cross-shape," and "x-shape," and the like). Likewise, a duct 116, 116a, 116b may comprise a tubular architecture and/or branching or bifurcating tubular or otherwise flowing architecture. In addition, a duct 116, 116a, 116b may comprise any suitable configuration. Thus, a duct 116, 116a, 116b may not, in various embodiments, be limited to a straight or substantially straight (or unbranched) configured, but may be configured to provide a most suitable connection between plenums. Any of the duct configurations described herein may, as described herein, be coupled by a flexible material 606a, 606b, 606c, for example, and as described in greater detail below.

Figure 5:
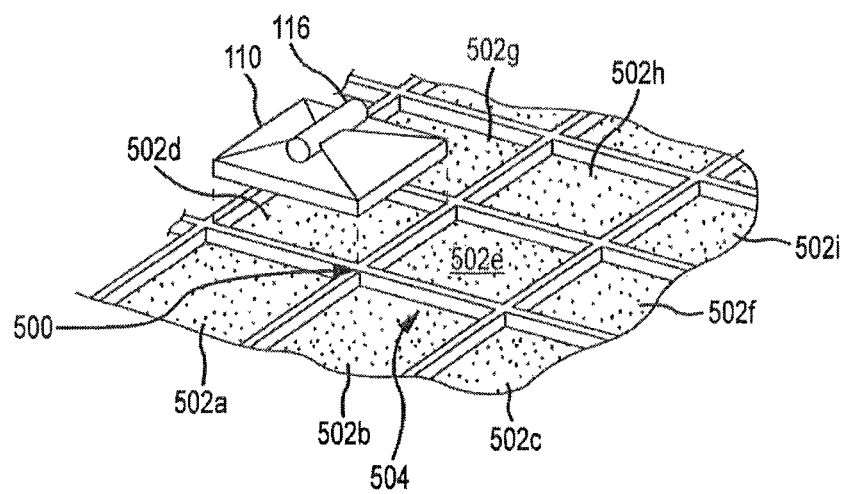
FIG. 5 illustrates, in accordance with various embodiments, a grid to which a plurality of modular plenums may be coupled.

With reference to FIG. 5, a modular plenum 110 may fit into a frame 500, which may comprise a plurality of plenum receptacles 502a, 502b, 502c, 502e, 502f, 502g, 502h, and 502i. Each plenum receptacle 502a, 502b, 502c, 502e, 502f, 502g, 502h, and 502i may be configured to receive a modular plenum. For example, the plenum receptacle 502d may be configured to receive the modular plenum 110. A variety of methods may be employed to couple a modular plenum to a receptacle. For example, receptacle may be constructed as a channel such that the edges of a modular plenum may be fit (e.g., snap or pressure fit) or otherwise bonded within channel. Similarly, each receptacle may simply comprise a plurality of edges into which a modular plenum may be pressure fit or otherwise bonded.

In addition, as shown at FIG. 5, the frame 500, which may be coupled or integral to the inner surface 504 of the nacelle 100, may act as a frame that provides support to the nacelle 100. Thus, the sag or deformation that many common nacelles may suffer from may be eliminated or reduced by the frame 500. In various embodiments, although the frame depicted in FIG. 5 is composed of a plurality of square-shaped sub-frames (or plenum receptacles), any shape of frame and/or sub-frame may be implemented (e.g., a triangular frame and/or sub-frame).

Figure 6:
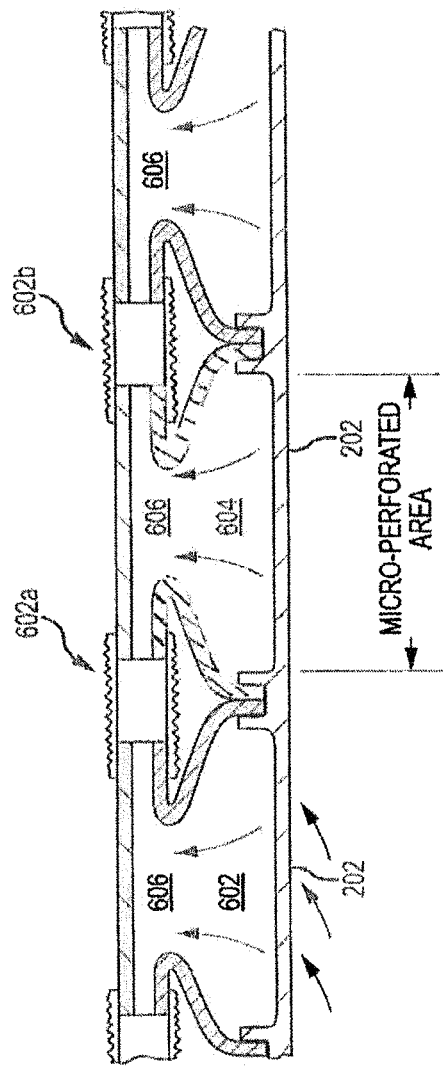
FIG. 6 illustrates, in accordance with various embodiments, a cross-sectional view of a plurality of interconnected modular plenums.

Referring to FIG. 6, a cross-sectional area of two of modular plenums 602 and 604 coupled to one another by two pieces of flexible material 602a and 604a is shown. As shown, air may enter a perforated outer surface 202. However, each modular plenum 602 and 604 may, here, permit air to flow through a duct 606 defined only by each extent of flexible material 602a and 604b. Thus, air may flow into the duct 606 from modular plenums 602 and/or 604 into the duct 606 only as defined by the pieces of flexible material 602a and 604a.

This same ducting concept may be implemented, for example, with respect to a plurality of modular plenums that are coupled together by a single stretch of ducting. For example, a first group of three interconnected modular plenums, such as those depicted at FIG. 3, may be coupled to a second group of modular plenums by a piece of flexible material. Thus, a variety of ducting configurations are possible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "various embodiments", "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A system for controlling aircraft boundary layer airflow comprising:
   a frame structure configured to be coupled to an inner surface of an aircraft nacelle, the frame configured to provide support to the nacelle;
   a plurality of modular plenums configured to be received by the frame structure, the modular plenum comprising a truncated tetrahedron intersected tangentially at its apex by a pipe duct,
   wherein the frame structure comprises a plurality of sub-frames;
   each modular plenum configured to fit within a sub-frame; and
   the sub-frames each comprising a geometry complementary to the geometry of the sub-frames.

2. The system of claim 1, further comprising a flexible material configured to couple a first duct to a second duct.

3. The system of claim 1, further comprising the nacelle configured to receive the system.

4. The system of claim 3, wherein the nacelle comprises a perforated outer surface, wherein air enters the modular plenum through the perforated outer surface.

5. The system of claim 1, further comprising a pump that draws air into the modular plenum.

6. A system for controlling aircraft boundary layer airflow comprising:
   a frame structure configured to be coupled to an inner surface of an aircraft nacelle, the frame configured to provide support to the nacelle;
   a modular plenum configured to be received by the frame structure, the modular plenum comprising a truncated tetrahedron intersected tangentially at its apex by a pipe duct.

7. The system of claim 6, wherein the frame comprises a plurality of sub-frames.

8. The system of claim 7, wherein the modular plenum is configured to fit within a sub-frame.

9. The system of claim 6, further comprising the nacelle configured to receive the system.

10. The system of claim 9, wherein the nacelle comprises a perforated outer surface, wherein air enters the modular plenum through the perforated outer surface.

11. The system of claim 10, further comprising a pump that draws air into the modular plenum.

12. The system of claim 11, wherein the pump draws air into the modular plenum through the perforated outer surface formed in the aircraft nacelle.

13. The system of claim 7, wherein the plurality of sub-frames are configured to provide support to the aircraft nacelle.

* * * * *